United States Patent
Sun et al.

(10) Patent No.: US 10,878,999 B2
(45) Date of Patent: Dec. 29, 2020

(54) APPARATUS AND METHOD FOR MANUFACTURING MOLDING INDUCTOR

(71) Applicant: National Tsing Hua University, Hsinchu (TW)

(72) Inventors: Szu-Lung Sun, Hsinchu (TW); Dongliang Daniel Sheu, Tainan (TW); Chen-Yun Wu, Tainan (TW)

(73) Assignee: National Tsing Hua University

( * ) Notice: Subject to any disclaimer, the term of this patent is extended or adjusted under 35 U.S.C. 154(b) by 360 days.

(21) Appl. No.: 16/016,582

(22) Filed: Jun. 23, 2018

(65) Prior Publication Data
US 2019/0326052 A1    Oct. 24, 2019

(30) Foreign Application Priority Data
Apr. 20, 2018  (TW) .............................. 107113573 A

(51) Int. Cl.
| H01F 41/02 | (2006.01) |
| B29C 33/00 | (2006.01) |
| B29C 67/24 | (2006.01) |
| H01F 1/34 | (2006.01) |
| H01F 27/255 | (2006.01) |
| H01F 27/28 | (2006.01) |
| H01F 27/29 | (2006.01) |
| H01F 41/04 | (2006.01) |
| H01F 41/10 | (2006.01) |
| H01F 41/12 | (2006.01) |
| B29K 509/00 | (2006.01) |
| B29L 31/34 | (2006.01) |

(52) U.S. Cl.
CPC ......... *H01F 41/0246* (2013.01); *B29C 33/00* (2013.01); *B29C 67/24* (2013.01); *H01F 1/344* (2013.01); *H01F 27/255* (2013.01); *H01F 27/28* (2013.01); *H01F 27/29* (2013.01); *H01F 41/04* (2013.01); *H01F 41/10* (2013.01); *H01F 41/127* (2013.01); *B29K 2509/00* (2013.01); *B29K 2995/0008* (2013.01); *B29L 2031/3406* (2013.01); *Y10T 29/49073* (2015.01)

(58) Field of Classification Search
CPC .. H01F 2017/048; H01F 27/255; H01F 27/29; H01F 41/005; H01F 41/0246; H01F 41/0273; H01F 41/04; H01F 41/10; H01F 41/127; B29C 33/00; B29C 43/18; B29C 2043/568; B29C 70/62; B29K 2995/0008; B22F 2202/05; B30B 11/008; Y10T 29/4902; Y10T 29/49073; Y10T 29/49076
See application file for complete search history.

(56) References Cited

U.S. PATENT DOCUMENTS

| 2003/0156000 A1* | 8/2003 | Brunner ................ H01F 27/255 336/96 |
| 2018/0257139 A1* | 9/2018 | Hsu ......................... H01F 17/04 |
| 2019/0228904 A1* | 7/2019 | Suppes ..................... H01F 5/06 |

* cited by examiner

*Primary Examiner* — Peter Dungba Vo
*Assistant Examiner* — Joshua D Anderson

(57) ABSTRACT

The present invention discloses an apparatus and a method for manufacturing molding inductor. The apparatus mainly comprises a mold and at least one magnetic force generating unit. Particularly, the mold is designed to have one or more accommodation spaces to correspondingly receive one or more coils. On the other hand, the magnetic force generating unit is configured to apply a magnetic force to the accommodation spaces after a molding material doped with magnetic ferrite powder is filled into the accommodation spaces receiving with the coil therein. Consequently, the molding material is forced by a molding stress provided by the applied magnetic force to move effectively downward in the accommodation space, such that a molded body is eventually formed in the accommodation space.

12 Claims, 6 Drawing Sheets

APPARATUS AND METHOD FOR MANUFACTURING MOLDING INDUCTOR

BACKGROUND OF THE INVENTION

1. Field of the Invention

The present invention relates to the technology field of passive components, and more particularly to an apparatus and a method for manufacturing molding inductor. Differing from the fact that conventional technology often uses a punching force provided by an upper mold as a molding stress, magnetic force is particularly adopted for being the molding stress in the disclosed molding inductor manufacturing apparatus and method.

2. Description of the Prior Art

Inductor is one kind of passive component and commonly used to provide specific functions in an electronic circuit, such as filtering electromagnetic interference, blocking or shielding electromagnetic radiation, filtering noises from current signal, restricting instant surge from current signal, and stabilizing current signal. Based on constitution structures, conventional inductors are mainly divided into wire-wound inductor, molding inductor, and thin-film inductor, wherein the molding inductor is now widely used in various precision electronic products like smart phone, mobile electronic device, networking communication products, and vehicle electronic devices.

FIG. 1A and FIG. 1B illustrate schematic diagrams for describing manufacturing processes for making molding inductors. Engineers skilled in development and manufacture of the molding inductors should know that conventionally-used molding inductor manufacturing method commonly comprises following process steps:

Step (1): providing a lower mold 2' having a plurality of accommodating grooves 21';

Step (2): disposing a plurality of coils 51' into the accommodating grooves 21', respectively;

Step (3): filling a molding material 3' doped with magnetic ferrite powder into the accommodating grooves 21';

Step (4): providing an upper mold 4' having a plurality of punching members 41';

Step (5): moving the upper mold 4' to make each of the punching members 41' get into one accommodating groove 21' correspondingly;

Step (6): applying a molding stress to the molding material 3' by making the punching members 41' move downwardly in their corresponding accommodating groove 21' under a high-temperature environment, thereby leading the molding material 3' to become a molded body 52' having one coil 51' therein in each of the accommodating groove 21'; and Step (6): removing the upper mold 4', and then a plurality of molding inductors 5' are obtained from the accommodating groove 21' of the lower mold 2'.

It is worth noting that, in the case of the punching members 41' being controlled to move downwardly in their corresponding accommodating groove 21', a considerable friction force would be produced between the molding material 3' and the inner walls of the accommodating groove 21', wherein the friction force is resulted from the effect provided by a lateral stress on the molding material 3'. Engineers skilled in development and manufacture of the molding inductors have some findings about the induced friction force during practical use of the above-described molding inductor manufacturing method. The findings indicate that the friction force would cancel a portion of the molding stress provided by the upper mold 4', thereby causing the obtained molded body 52' has a nonuniform density distribution therein. Moreover, the findings also report that an exceedingly-strengthened molding stress would damage the enameled wire of the coil 51'.

From above descriptions, it is clear that how to design an effective solution for improving the conventional molding inductor manufacturing method has become an important issue. In view of that, inventors of the present application have made great efforts to make inventive research and eventually provided an apparatus and a method for manufacturing molding inductor.

SUMMARY OF THE INVENTION

The primary objective of the present invention is to disclose an apparatus and a method for manufacturing molding inductor. The apparatus mainly comprises a mold and at least one magnetic force generating unit. Particularly, the mold is designed to have one or more accommodation spaces to correspondingly receive one or more coils. On the other hand, the magnetic force generating unit is configured to apply a magnetic force to the accommodation spaces after a molding material doped with magnetic ferrite powder is filled into the accommodation spaces receiving with the coil therein. Consequently, the molding material is forced by a molding stress provided by the applied magnetic force to move effectively downward in the accommodation space, such that a molded body is eventually formed in the accommodation space. Moreover, because there is no any inductor molding machines being used during the practical application and operation of this molding inductor manufacturing apparatus, not only does the friction force between the molding material and the inner walls of the accommodation space be largely canceled, but also the enameled wire of the coil is prevented from being damaged by an exceedingly-strengthened molding stress provided by the inductor molding machine.

In order to achieve the primary objective of the present invention, the inventor of the present invention provides an embodiment for the apparatus for manufacturing molding inductor, comprising:

a mold, having one or more accommodating grooves for receiving one or more coils; and at least one magnetic force generating unit;

wherein a molding material doped with magnetic ferrite powder is able to be filled into the accommodating groove receiving with the coil, such that the magnetic force generating unit is configured to apply a magnetic force to the accommodating groove, thereby making the molding material become to a molded body in the accommodation space under a molding stress provided by the magnetic force.

In the embodiment of the apparatus for manufacturing molding inductor, wherein the apparatus further comprises:

a supporting substrate, wherein the one or more coils are facilitated to be correspondingly disposed into the one or more accommodating grooves by disposing the one or more coils on the supporting substrate in advance.

Moreover, in order to achieve the primary objective of the present invention, the inventor of the present invention also provides an embodiment for the method for manufacturing molding inductor, comprising following steps:

(1) providing a supporting substrate, a mold having one or more accommodating grooves, and at least one magnetic force generating unit;
(2) disposing one or more coils on the supporting substrate;
(3) connecting the supporting substrate to the mold, so as to correspondingly disposing the one or more coils into the one or more accommodating grooves;
(4) filling a molding material doped with magnetic ferrite powder into the one or more accommodating grooves; and
(5) controlling the magnetic force generating unit to apply a magnetic force to the one or more accommodating grooves, such that the molding material becomes to a molded body in the accommodation space under a molding stress provided by the magnetic force and a process temperature.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an apparatus and a method for manufacturing molding inductor disclosed by the present invention, embodiments of the present invention will be described in detail with reference to the attached drawings hereinafter.

Figure 3:
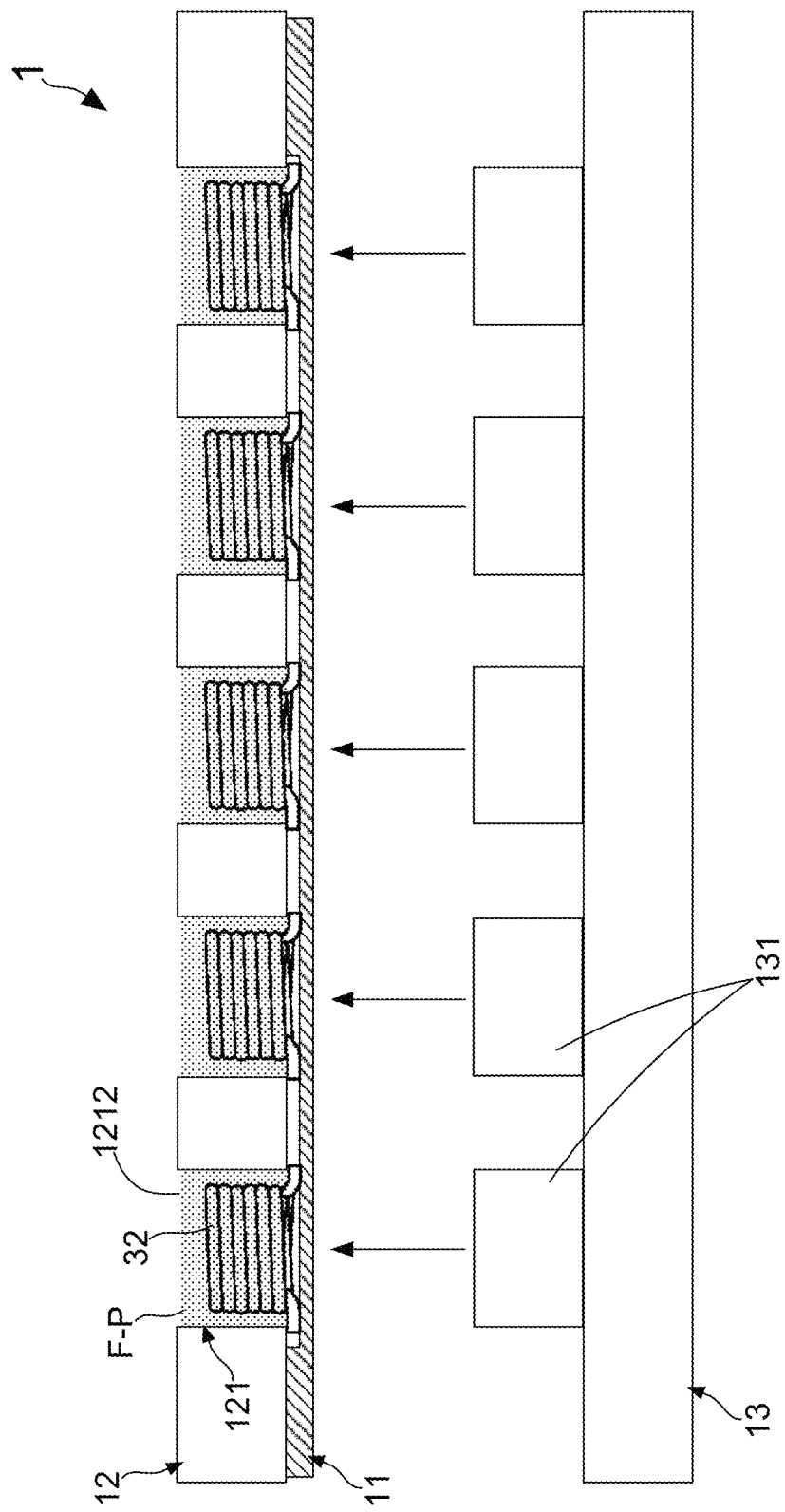
FIG. 3 shows a schematic cross-sectional view of the apparatus for manufacturing molding inductor.
Figure 4:
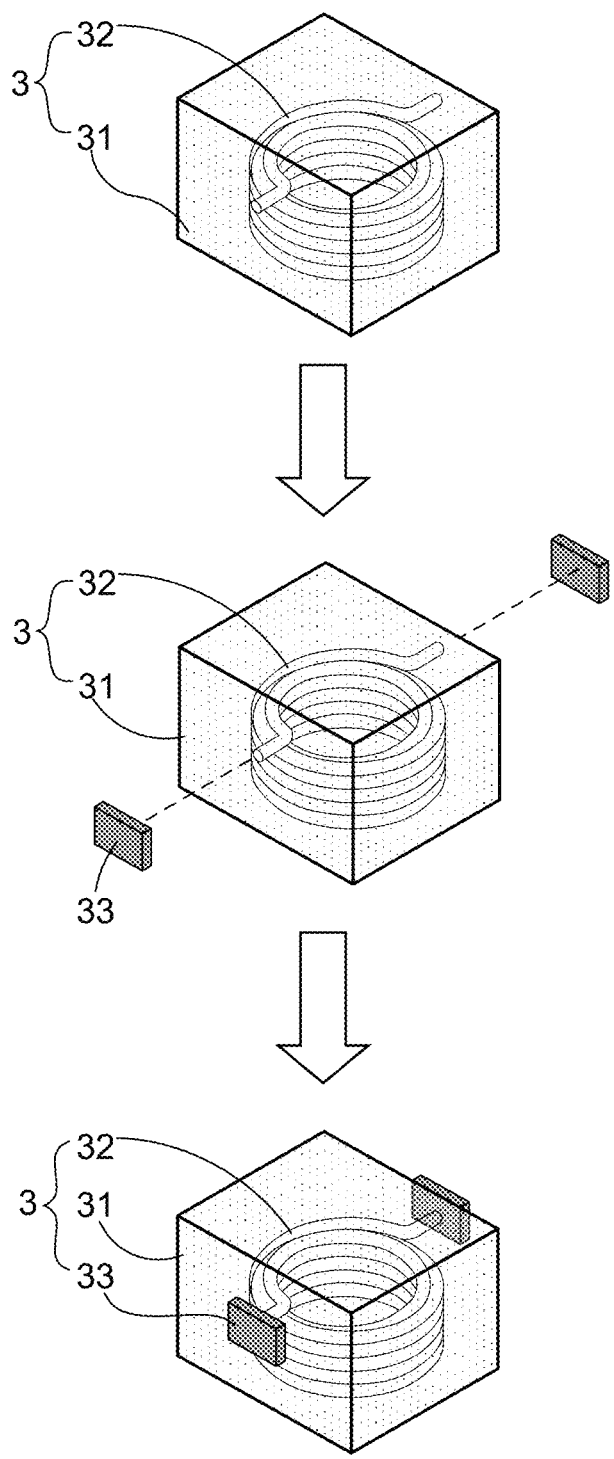
FIG. 4 shows a stereo diagram of a molded body.

With reference to FIG. 4, there is provided a schematic stereo diagram of an apparatus for manufacturing molding inductor according to the present invention. Moreover, please simultaneously refer to FIG. 3, which illustrates a schematic cross-sectional view of the apparatus for manufacturing molding inductor. According to the diagrams shown in FIG. 2 and FIG. 3, the apparatus 1 for manufacturing molding inductor mainly comprises: a supporting substrate 11, a mold 12, an inductor molding module 13, and a control module 14. The supporting substrate 11 is used for carrying one or more coils 32, and the coils 32 on the supporting substrate 11 are arranged to an array. On the other hand, the mold 12 has one or more accommodating grooves 121 for correspondingly receiving the one or more coils 32. Moreover, it is worth noting that each of the accommodating grooves 121 has a first opening 1211 and a second opening 1212.

When using this apparatus 1 to carry out a molding inductor manufacturing process, it needs to firstly connecting the supporting substrate 11 to the mold 12, thereby facilitating the one or more coils 32 on the supporting substrate 11 to be correspondingly disposed into the one or more accommodating grooves 121 via the first openings 1211. Subsequently, after filling a molding material F-P doped with magnetic ferrite powder into the accommodating grooves 1211, the inductor molding module 13 comprising one or more magnetic force generating units 131 is adopted for applying a magnetic force to the accommodating grooves 1211. As a result, the molding material F-P eventually becomes to a molded body 31 in the accommodation space 121 under a molding stress provided by the magnetic force and a process temperature. FIG. 4 shows a stereo diagram of the molded body 31.

Figure 2:
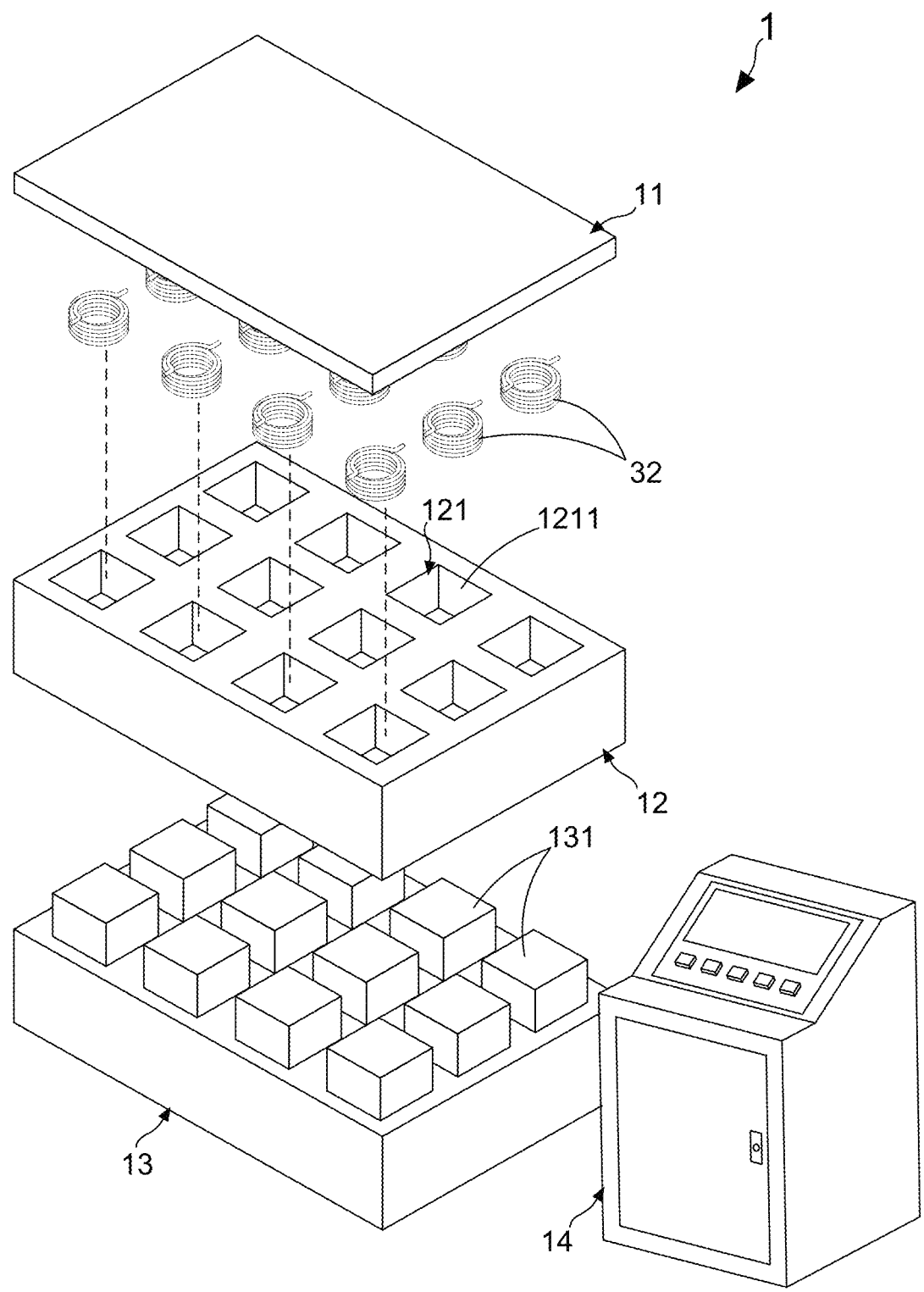
FIG. 2 shows a schematic stereo diagram of an apparatus for manufacturing molding inductor according to the present invention.
Figure 5:
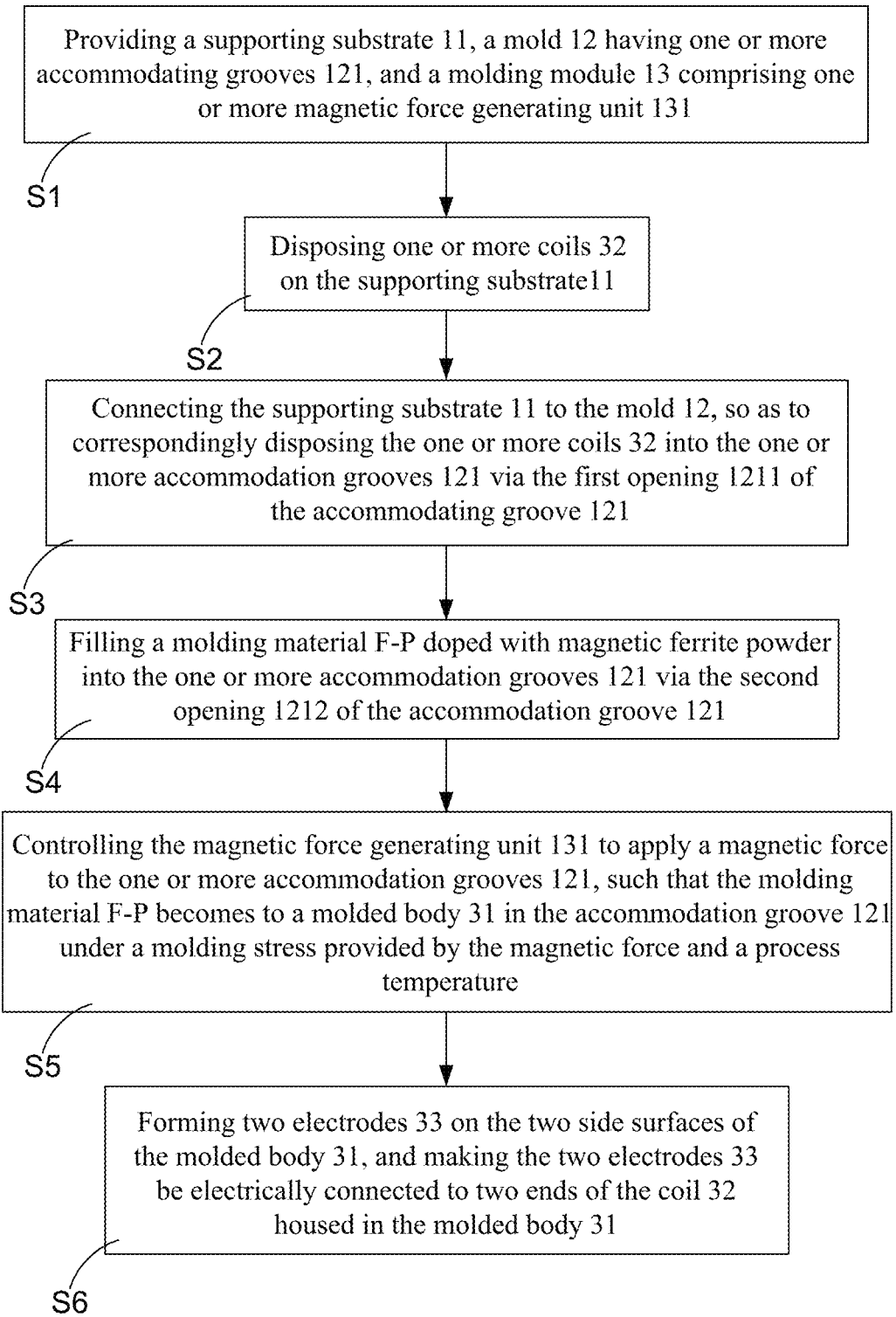
FIG. 5 shows a flowchart diagram of a method for manufacturing molding inductor according to the present invention.

Thus, above descriptions have introduced related constituting elements and their functions or features completely and clearly. Next, following paragraphs will continuously introduce a method for manufacturing molding inductor according to the present invention. With reference to FIG. 2, FIG. 3 and FIG. 4 again, and please simultaneously refer to FIG. 5, which illustrates a flowchart diagram of a method for manufacturing molding inductor according to the present invention. As FIG. 5 shows, the process procedure of this molding inductor manufacturing method is firstly proceeded to step S1, so as to provide a supporting substrate 11, a mold 12 having one or more accommodating grooves 121, and a molding module 13 comprising one or more magnetic force generating unit 131, wherein each of the accommodating grooves 121 has a first opening 1211 and a second opening 1212. Subsequently, the method proceeds to steps S2 and S3, such that one or more coils 32 are disposed on the supporting substrate 11, and then the supporting substrate 11 is connected to the mold 12 for facilitating the one or more coils 32 on the supporting substrate 11 to be correspondingly disposed into the one or more accommodating grooves 121 via the first openings 1211.

Continuously, the process procedure of this molding inductor manufacturing method is firstly proceeded to step S4, so as to fill a molding material F-P doped with magnetic ferrite powder into the one or more accommodating grooves 121. It needs to further explain that, the molding material F-P is commonly a resin-based material. On the other hand, the said magnetic ferrite powder has a magnetic permeability in a range between 5 H/m and 200 H/m, and can be selected from the group consisting of Sendust powder made of Fe—Si—Al alloy, Kool-Mu powder made of Fe—Si—Al alloy, MPP powder made of Fe—Ni—Mo alloy, Hi-Flux powder made of Fe—Ni alloy, X-Flux powder made of Fe—Si alloy, nickel oxide based ferrite powder ($NiO.Fe_2O_3$), zinc oxide based ferrite powder ($ZnO.Fe_2O_3$), copper oxide based ferrite powder ($CuO.Fe_2O_3$), manganese oxide based ferrite powder ($MnO.Fe_2O_3$), cobalt oxide based ferrite powder ($CoO.Fe_2O_3$), barium oxide based ferrite powder ($BaO.Fe_2O_3$), Ni—Zn based ferrite powder, Ni—Cu based ferrite powder, Mn—Zn based ferrite powder, Ni—Zn based ferrite powder, and combination of aforesaid two or more ferrite powders.

Next, in step S5, the control module 14 is operated to control the magnetic force generating unit 131 to apply a magnetic force to the one or more accommodating grooves 121, such that the molding material F-P becomes to a molded body 31 in the accommodation space 121 under a molding stress provided by the magnetic force and a process temperature of 80-150° C. From FIG. 1A and FIG. 1B, it is understood that conventional molding inductor manufacturing technology commonly apply a molding stress to one or more accommodating grooves 21' by moving an upper mold 4' to make each of the punching members 41' get into one accommodating groove 21' correspondingly, wherein an experience range of the molding stress is between 400 MPa and 1200 MPa. Therefore, it is meant that the magnetic force provided by the inductor molding module 13 must applying the same molding stress (400-1200 MPa) to the molding material F-P in the accommodation space 121, in order to make the molding material F-P become to a molded body 31 under 80-150° C.

Engineers skilled in development and manufacture of magnetic force generating devices should know that, a simple example for the magnetic force generating unit 131 of the inductor molding module 13 is electromagnet, which is able to output magnetic force with unit of Newton (N). Therefore, related unit conversion formulas or equations are adopted for firstly converting the unit of MPa to the unit of kgf/cm², and subsequently converting the unit of kgf to the unit of Newton (N). Results of aforesaid two unit conversion processes are shown in following Table (1). Consequently, based on the basic conversion results of Table (1), it is able to further convert the experience range of the molding stress from 400-1,200 MPa to 39,984-1,199,520 N/cm².

TABLE 1

| 1 MPa | 10.2 kgf/cm² |
|---|---|
| 1 kgf | 9.8 N |

After the step S5 is completed, the method eventually proceeds to step S6, so as to form two electrodes 33 on the two side surfaces of the molded body 31, and make the two electrodes 33 be electrically connected to two ends of the coil 32 housed in the molded body 31. Herein, it needs to further emphasize that the present invention does not particularly limit the form or type of the magnetic force provided by the magnetic force generating unit 131 of the inductor molding module 13, which can be is selected from the group consisting of pulse magnetic force, constant magnetic force, non-linear magnetic force, dynamic magnetic force, and combination of aforesaid two or more magnetic forces. For instance, the magnetic force can be a combination of one pulse magnetic force and one constant magnetic force. When such magnetic force is applied to the accommodating grooves 121, the molding material F-P in the accommodating groove 1211 would be vibrated by the pulse magnetic force is used, thereby having a uniform distribution in the accommodating groove 1211. Moreover, the constant magnetic force is adopted for being the molding stress to make the molding material F-P become to the molded body 31 in the accommodating groove 1211. It is noted that, because there is no any conventional inductor molding machines or apparatuses being used during the practical application and operation of this molding inductor manufacturing apparatus 1, not only does the friction force between the molding material F-P and the inner walls of the accommodation space 121 be largely canceled, but also the enameled wire of the coil 32 is prevented from being damaged by an exceedingly-strengthened molding stress provided by the conventional inductor molding machine.

Exemplary Embodiment

In an exemplary embodiment, at least one amorphous magnetic conductive material is used as a raw material for the fabrication of the molded body 31. To prepare and obtain the raw material, Fe—Si—Cr—B ferrite powder with an average particle size of 35 μm and Fe—Si—Cr—B ferrite powder with an average particle size of 15 μm are firstly mixed based on a mixing ratio of 0.75:0.255. Subsequently, the mixture of the two ferrite powders are further mixed with a resin-based material comprising epoxy resin as adhesive and hardening agent, thereby obtaining the molding material F-P. Moreover, a molding stress is properly calculated for making the molding material F-P become to one molded body 31 in the accommodation space 121 under process temperature of 80-150° C. The calculated data of the molding stress are presented by following Table (2). In this exemplary embodiment, the fabricated molded body 31 has a size of 7 mm×7 mm×3 mm

TABLE 2

Figure 1A:
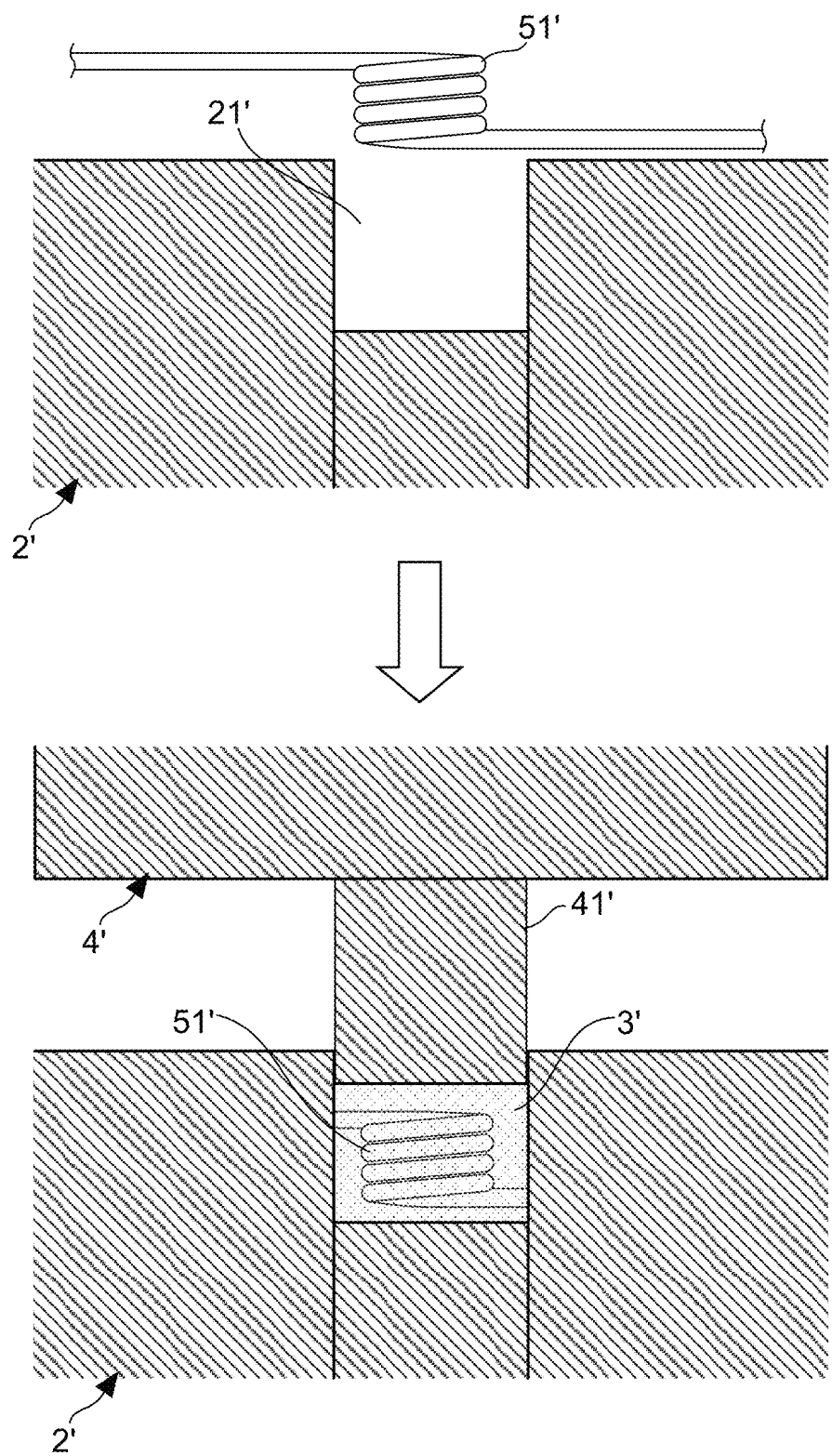
FIG. 1A and FIG. 1B show schematic diagrams for describing manufacturing processes for making molding inductors.
Figure 1B:
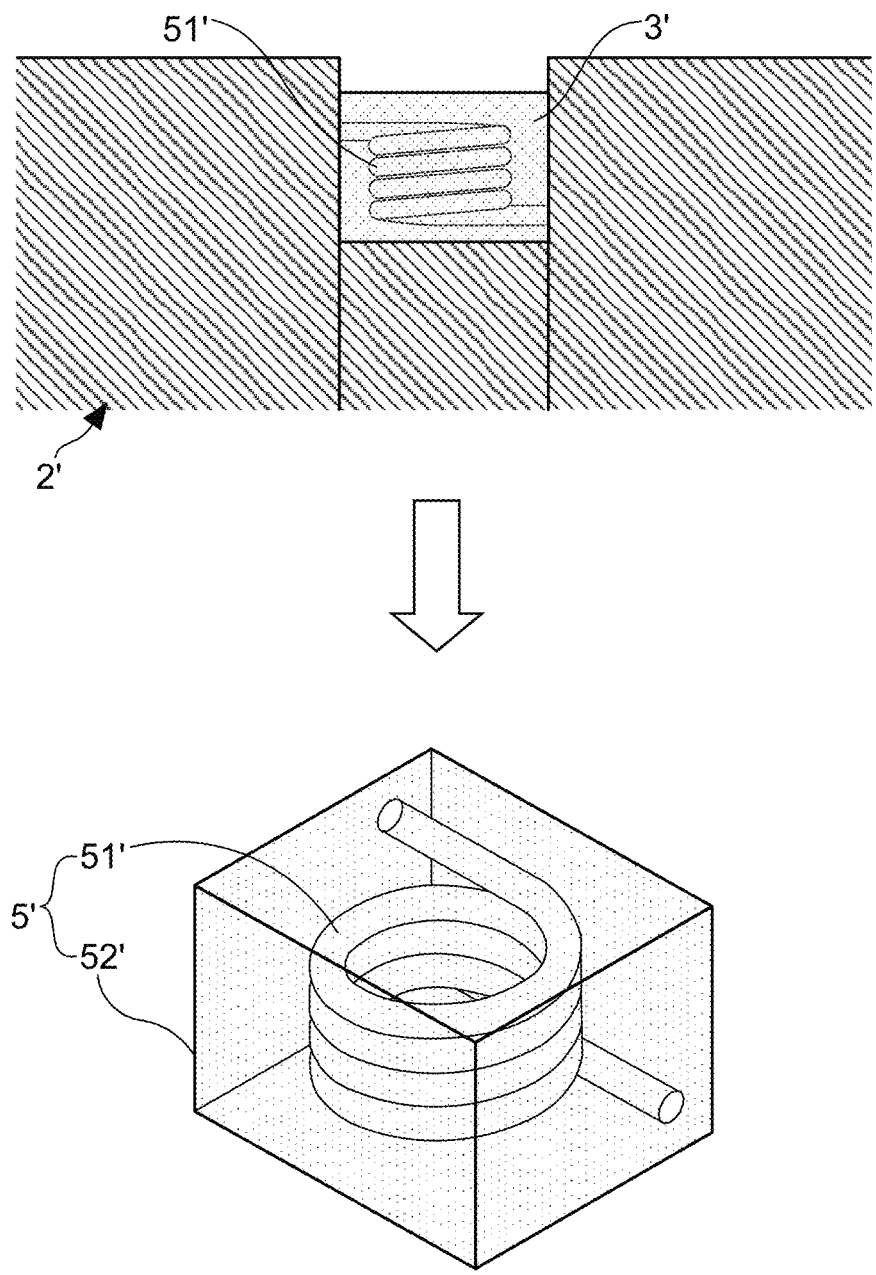

| | Molding stress |
|---|---|
| conventional molding inductor manufacturing technology | With reference to FIG. 1A and FIG. 1B, a total molding stress of 450 kgf/cm² is applied to the lower mold 2' having ten accommodating grooves 21', wherein each of the accommodating grooves 21' is subject to a molding stress of 45 kgf/cm². |
| Method for manufacturing molding inductor of the present invention | For the mold 12 having ten accommodating grooves 121, each of the accommodating grooves 121 is subject to a magnetic force of 6.1905 kgf/cm. |

According to an assumed size of the molded body 31, for example, 7 mm×7 mm×3 mm, it is able to calculated that the stressed area of each one accommodating groove 121 is 0.000049 m². After that, based on the fact that the magnetic force applied to each one accommodating groove 121 must has strength of at least 6.1905 kgf, the intensity of magnetic field that each one magnetic force generating unit 131 of the inductor molding module 13 can be further calculated by using following mathematic equation (1).

$$F = \frac{10^7}{8\pi} B_0^2 S_0 (N) \qquad (1)$$

In above-presented mathematic equation, $B_0$ means magnetic flux density, $S_0$ represents stressed area, and F is magnetic force (unit: N). Therefore, after the molding material F-P doped with magnetic ferrite powder is filled into the accommodating grooves 121 receiving with coil 32, the control module 14 is operated to control the magnetic force generating unit 131 to provide a magnetic flux density of 18,300 Gauss (i.e., 1.83 Tesla) to the accommodating grooves 121, thereby applying a magnetic force of 6.66 kgf to each of the accommodating grooves 121. Herein, it needs to further explain that, the magnetic force is a combination of one pulse magnetic force and one constant magnetic force in the exemplary embodiment. The pulse magnetic force has a duty cycle of 50%, and is applied to the accommodating groove 121 by a working period of 1 second for 2 minutes. Moreover, after the applying of the pulse magnetic force is finished, the constant magnetic force is subsequently applied to the accommodating groove 121 by strength of 6.66 kgf.

Thus, after the applying of the magnetic force is completed, the F-P doped with magnetic ferrite powder becomes to one molded body 31 in the accommodating groove 121, wherein the size of the molded body 31 is 7 mm×7 mm×3 mm Following Table (3) shows merriment data of the magnetic permeability of the obtained molded body 31.

TABLE 3

| | Magnetic permeability |
|---|---|
| conventional molding inductor manufacturing technology | 17.2 |

TABLE 3-continued

| Method for manufacturing molding inductor of the present invention | Magnetic permeability |
|---|---|
| | 23 |

Engineers skilled in development and manufacture of molding inductors should know that, having a lower (higher) magnetic permeability means the molding inductor also has a lower (higher) density. Therefore, From Table (3), it is understood that the mold inductor fabricated by using the apparatus 1 and the method proposed by the present invention includes higher density than that fabricated by using conventional mold inductor manufacturing technology. On the other hand, it needs to emphasize that, in spite of the fact that the apparatus and method for manufacturing molding inductor proposed by the present invention adopt a mold 12 having ten accommodating grooves 121 in the above-described exemplary embodiment, the mold 12 does not be limited to have a plurality of accommodating grooves 121. Briefly speaking, the mold 12 used in the apparatus and method for manufacturing molding inductor proposed by the present invention can also merely has one single accommodating groove 121.

Moreover, it needs to further emphasize that, despite of the fact that above-described exemplary embodiment shows that the apparatus and method for manufacturing molding inductor proposed by the present invention can indeed be used to make one or more molding inductors, the apparatus can also be applied in the conventionally-used molding inductor manufacturing machine, such as the conventional molding inductor manufacturing machine (as shown by FIG. 1A and FIG. 1B) comprising an upper mold 4' and a lower mold 2'.

Therefore, through above descriptions, all embodiments and their constituting elements of the apparatus for manufacturing molding inductor proposed by the present invention have been introduced completely and clearly; in summary, the present invention includes the advantages of:

(1) FIG. 1A and FIG. 1B have introduced manufacturing processes when using molding inductor manufacturing technology to make molding inductors. However, in the case of the punching members 41' being controlled to move downwardly in their corresponding accommodating groove 21', a considerable friction force would be produced between the molding material 3' and the inner walls of the accommodating groove 21', wherein the friction force is resulted from the effect provided by a lateral stress on the molding material 3'. Engineers skilled in development and manufacture of the molding inductors have some findings about the induced friction force during practical use of the conventional molding inductor manufacturing method. The findings indicate that the friction force would cancel a portion of the molding stress provided by the upper mold 4', thereby causing the obtained molded body 52' has a nonuniform density distribution therein. In view of that, the present invention discloses an apparatus and a method for manufacturing molding inductor. The apparatus mainly comprises a mold 12 and at least one magnetic force generating unit 131. Particularly, the mold 12 is designed to have one or more accommodation spaces 121 to correspondingly receive one or more coils 32. On the other hand, the magnetic force generating unit 131 is configured to apply a magnetic force to the accommodation spaces 121 after a molding material F-P doped with magnetic ferrite powder is filled into the accommodation spaces 121 receiving with the coil 32 therein. In the present invention, the magnetic force is used as a molding stress to force the molding material F-P move downwardly in the accommodation space 121, such that a molded body 31 is eventually formed in the accommodation space 121.

Because there is no any conventional inductor molding machines being used during the practical application and operation of the molding inductor manufacturing apparatus of the present invention, not only does the friction force between the molding material F-P and the inner walls of the accommodation space be largely canceled, but also the enameled wire of the coil is prevented from being damaged by an exceedingly-strengthened molding stress provided by the conventional inductor molding machine.

The above description is made on embodiments of the present invention. However, the embodiments are not intended to limit scope of the present invention, and all equivalent implementations or alterations within the spirit of the present invention still fall within the scope of the present invention.

What is claimed is:

1. An apparatus for manufacturing molding inductor, comprising:
   a mold, having one or more accommodation spaces configured to receive one or more coils respectively and a molding material doped with magnetic ferrite powder surrounding the one or more coils within the one or more accommodation spaces;
   a supporting substrate configured to have the one or more coils disposed on a top surface of the supporting substrate and configured to connect to the mold such that the one or more coils disposed on the supporting substrate are disposed in corresponding accommodation spaces of the one or more accommodation spaces of the mold; and
   at least one magnetic force generating unit disposed adjacent to the at least one or more accommodation spaces and below a bottom surface of the supporting substrate opposite the top surface of the supporting substrate, wherein the at least one magnetic force generating unit is configured to apply a magnetic force to the at least one accommodation space of the mold to thereby convert the molding material surrounding the one or more coils into one or more molded bodies in the accommodation spaces respectively under a molding stress provided by the magnetic force.

2. The apparatus of claim 1, wherein the mold and the accommodation spaces are formed by two independent members or integrated to one single article.

3. The apparatus of claim 1, wherein the magnetic force provided by the at least one magnetic force generating unit is selected from the group consisting of pulse magnetic force, constant magnetic force, non-linear magnetic force, dynamic magnetic force, and combination of two or more aforementioned magnetic forces.

4. The apparatus of claim 1, wherein each of the one or more accommodation spaces comprise:
   a first opening, wherein the one or more coils on the supporting substrate are able to be correspondingly disposed into the one or more accommodation spaces via the first openings by connecting the supporting substrate to the mold; and
   a second opening for facilitating the molding material to be filled into the accommodation spaces.

5. The apparatus of claim 4, wherein there is one opening serving functions of both the first opening and the second opening.

6. The apparatus of claim 1, further comprising:
a control module, being electrically connected to the at least one magnetic force generating unit, so as to control the at least one magnetic force generating unit to output the magnetic force to the one or more accommodation spaces.

7. A method for manufacturing molding inductor, comprising the following steps:
(1) providing a supporting substrate, a mold having one or more accommodation spaces, and at least one magnetic force generating unit;
(2) disposing one or more coils on a top surface of the supporting substrate;
(3) connecting the supporting substrate to the mold, so as to dispose the one or more coils into corresponding accommodation spaces of the mold;
(4) filling a molding material doped with magnetic ferrite powder into the one or more accommodation spaces to surround the one or more coils deposed within the one or more accommodation spaces; and
(5) controlling the at least one magnetic force generating unit disposed below a bottom surface of the supporting substrate opposite the top surface of the supporting substrate to apply a magnetic force to the one or more accommodation spaces to convert the molding material into a molded body in the at least one accommodation space under a molding stress provided by the magnetic force and a process temperature.

8. The method of claim 7, further comprising following step:
(6) forming two electrodes on two side surfaces of the molded body, and making the two electrodes electrically connected to two ends of the coil housed in the molded body.

9. The method of claim 7, wherein the magnetic ferrite powder has a magnetic permeability in a range between 5 H/m and 200 H/m, and the molding material is a resin-based material.

10. The method of claim 7, wherein the magnetic force provided by the at least one magnetic force generating unit is selected from the group consisting of pulse magnetic force, constant magnetic force, non-linear magnetic force, dynamic magnetic force, and combination of two or more aforementioned magnetic forces.

11. The method of claim 7, wherein the magnetic ferrite powder is selected from the group consisting of Sendust powder made of Fe—Si—Al alloy, Kool-Mu powder made of Fe—Si—Al alloy, MPP powder made of Fe—Ni—Mo alloy, Hi-Flux powder made of Fe—Ni alloy, X-Flux powder made of Fe—Si alloy, nickel oxide based ferrite powder ($NiO.Fe_2O_3$), zinc oxide based ferrite powder ($ZnO.Fe_2O_3$), copper oxide based ferrite powder ($CuO.Fe_2O_3$), manganese oxide based ferrite powder ($MnO.Fe_2O_3$), cobalt oxide based ferrite powder ($CoO.Fe_2O_3$), barium oxide based ferrite powder ($BaO.Fe_2O_3$), Ni—Zn based ferrite powder, Ni—Cu based ferrite powder, Mn—Zn based ferrite powder, Ni—Zn based ferrite powder, and combination of two or more aforementioned ferrite powders.

12. The method of claim 7, wherein the process temperature is in a range from 80° C. to 150° C.

* * * * *